(12) United States Patent
Choi

(10) Patent No.: US 7,062,299 B2
(45) Date of Patent: Jun. 13, 2006

(54) WIRELESS TERMINAL CAPABLE OF AUTOMATICALLY SETTING ITS FUNCTIONS AND METHOD FOR THE SAME

(75) Inventor: Hye-Rym Choi, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 213 days.

(21) Appl. No.: 10/284,975

(22) Filed: Oct. 31, 2002

(65) Prior Publication Data

US 2003/0093370 A1    May 15, 2003

(30) Foreign Application Priority Data

Nov. 6, 2001   (KR) ...................... 10-2001-0068978
Sep. 16, 2002  (KR) ...................... 10-2002-0056169

(51) Int. Cl.
*H04B 1/38* (2006.01)
*G06F 3/00* (2006.01)

(52) U.S. Cl. ................. 455/566; 715/812; 715/747

(58) Field of Classification Search ............ 455/566; 345/619, 811, 747, 745, 825, 765, 812
See application file for complete search history.

(56) References Cited

U.S. PATENT DOCUMENTS

| | | | | |
|---|---|---|---|---|
| 4,964,077 A | * | 10/1990 | Eisen et al. ................. | 715/707 |
| 5,496,177 A | * | 3/1996 | Collia et al. ................. | 434/118 |
| 5,583,763 A | * | 12/1996 | Atcheson et al. ............... | 707/3 |
| 5,799,292 A | * | 8/1998 | Hekmatpour .................. | 706/11 |
| 5,823,788 A | * | 10/1998 | Lemelson et al. .......... | 434/350 |
| 6,005,567 A | * | 12/1999 | Nielsen ....................... | 345/823 |
| 6,061,576 A | * | 5/2000 | Terrasson ................... | 455/566 |
| 6,144,863 A | * | 11/2000 | Charron ..................... | 455/566 |
| 6,292,676 B1 | * | 9/2001 | Ozaki et al. ................. | 455/566 |
| 6,346,963 B1 | * | 2/2002 | Katsumi ................... | 348/14.09 |
| 6,583,797 B1 | * | 6/2003 | Roth .......................... | 715/810 |
| 6,597,314 B1 | * | 7/2003 | Beezer et al. ............... | 715/812 |
| 2001/0034244 A1 | * | 10/2001 | Calder et al. ............... | 455/556 |
| 2002/0059584 A1 | * | 5/2002 | Ferman et al. ................ | 725/34 |
| 2002/0118223 A1 | * | 8/2002 | Steichen et al. ............ | 345/745 |
| 2002/0145627 A1 | * | 10/2002 | Whitmarsh et al. ......... | 345/745 |
| 2002/0180805 A1 | * | 12/2002 | Chickering et al. ......... | 345/812 |
| 2003/0061610 A1 | * | 3/2003 | Errico ......................... | 725/46 |

FOREIGN PATENT DOCUMENTS

JP            403213094 A   *  9/1991

* cited by examiner

*Primary Examiner*—Ryan Yang
(74) *Attorney, Agent, or Firm*—Dilworth & Barrese LLP

(57) ABSTRACT

Disclosed are a wireless terminal and method, which can recognize a user's preference-setting pattern for settable functions of the wireless terminal and automatically change the setting of the functions without a user interface. The method includes the steps of: periodically checking set values for each of the functions and storing the set values in data tables in an arrangement according to predetermined conditions; estimating a statistic of the set values for each of the functions based on the data tables; and controlling each of the functions according to the estimated statistic.

12 Claims, 4 Drawing Sheets

WIRELESS TERMINAL CAPABLE OF AUTOMATICALLY SETTING ITS FUNCTIONS AND METHOD FOR THE SAME

PRIORITY

This application claims priority to applications entitled "Wireless Terminal Capable of Automatically Setting Its Functions and Method for the Same", filed in the Korean Industrial Property Office on Nov. 6, 2001 and Sep. 16, 2002, and assigned Serial Nos. 2001-68978 & 2002-56169, respectively, the contents of which are hereby incorporated by reference.

BACKGROUND OF THE INVENTION

1. Field of the Invention

The present invention relates to a wireless terminal, and more particularly to a wireless terminal which can automatically and suitably set various selectable functions of the wireless terminal according to a user's preferences, and a method for the same.

2. Description of the Related Art

In general, a wireless terminal has various functions which can be set and adjusted by a user, such as a bell volume adjusting function, an LCD contrast adjusting function, and a bell/vibration shifting function. Usually, the user properly sets such functions according to his/her time and place of use of the terminal.

For example, the LCD contrast adjusting function enables a user of the wireless terminal to optionally set and adjust contrast of an LCD screen to a desired level. Likewise, the bell volume adjusting function and bell/vibration shifting function also enable the user to optionally set and adjust the bell sound to a desired volume or optionally shift a ringer mode of the terminal between a bell mode and a vibration mode.

However, in the case where the LCD contrast is set and adjusted by the user, the user has to adjust the LCD contrast whenever the intensity of light in the vicinity of the terminal changes. Further, the user may often have to adjust the bell volume or shift the ringer mode of the terminal between the bell and vibration modes according to time and place of use, even after the user has already set the bell volume and the ringer mode of the terminal.

SUMMARY OF THE INVENTION

Accordingly, the present invention has been made to solve the above-mentioned problems occurring in the prior art, and an object of the present invention is to provide a wireless terminal and method, which can recognize a user's preference-setting pattern for settable functions of the wireless terminal and automatically change the setting of the functions without a user interface.

In order to accomplish this object, there is provided a method for controlling functions of a wireless terminal, each of the functions having at least one settable value, the method comprising the steps of: periodically checking set values for each of the functions and storing the set values in data tables in an arrangement according to predetermined conditions; estimating a statistic of the set values for each of the functions with reference to the data tables; and controlling each of the functions according to the estimated statistic.

In accordance with another aspect of the present invention, there is provided a wireless terminal capable of controlling its functions, each of the functions having at least one settable value, the wireless terminal comprising: data tables for storing set values for each of the functions in an arrangement according to predetermined conditions; a control section which periodically checks the set values for each of the functions, stores the set values in the data tables, estimates a statistic of the set values for each of the functions with reference to the data tables, and controls each of the functions according to the estimated statistic.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description of the present invention, a detailed description of known functions and configurations incorporated herein will be omitted when it may make the subject matter of the present invention rather unclear.

In a wireless terminal according to one embodiment of the present invention, a plurality of tables, each of which contains set values according to predetermined conditions such as time and days of the week, are created for functions of the wireless terminal, and the set values set by a user according to the conditions are stored in each table. Thereafter, the set values are renewed following the user's habits, that is, the wireless terminal monitors the predetermined conditions such as time and days of the week and automatically changes the set values with reference to the values according to the corresponding condition.

Figure 1:
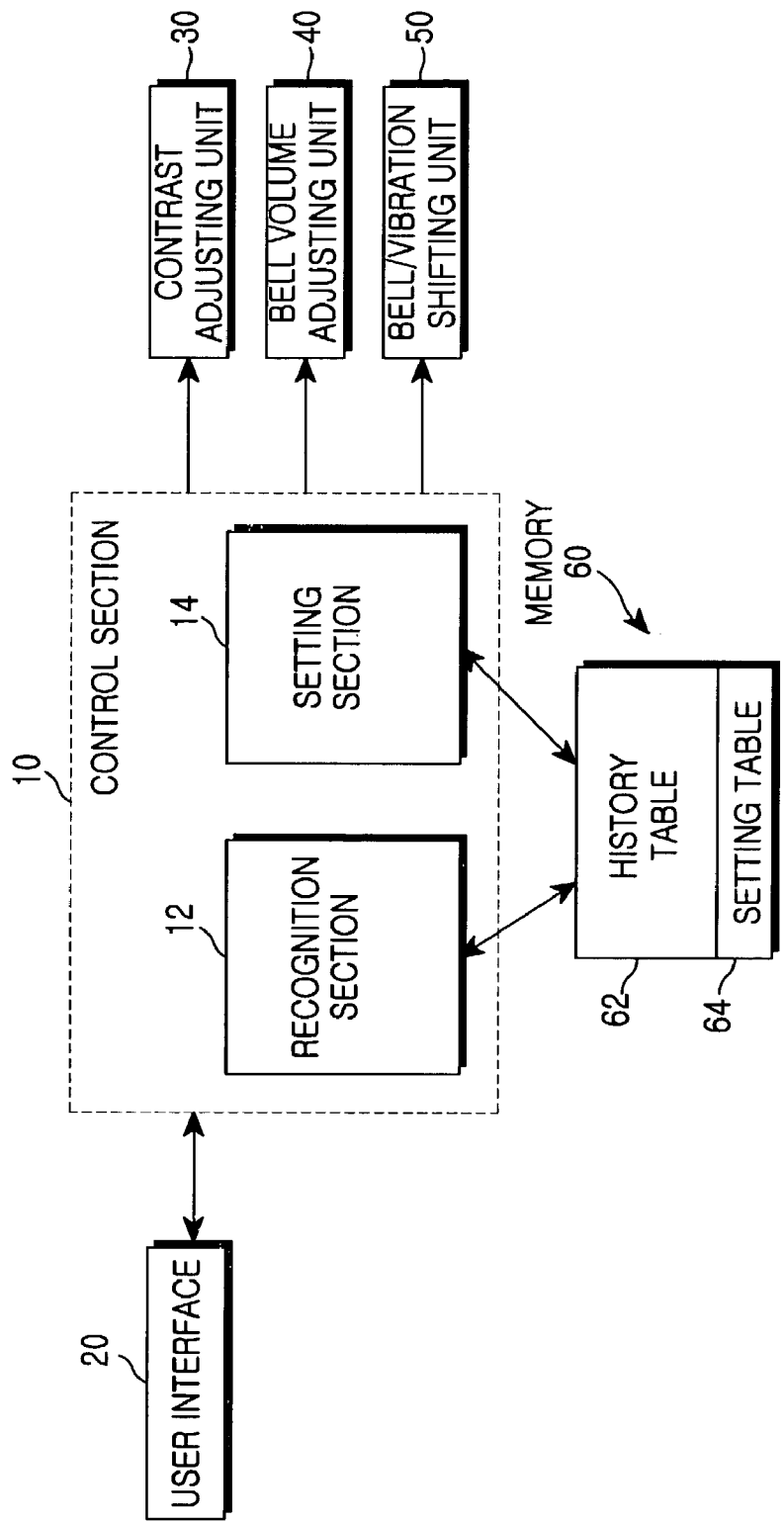
FIG. 1 is a block diagram of a wireless terminal according to a preferred embodiment of the present invention.
Figure 2:
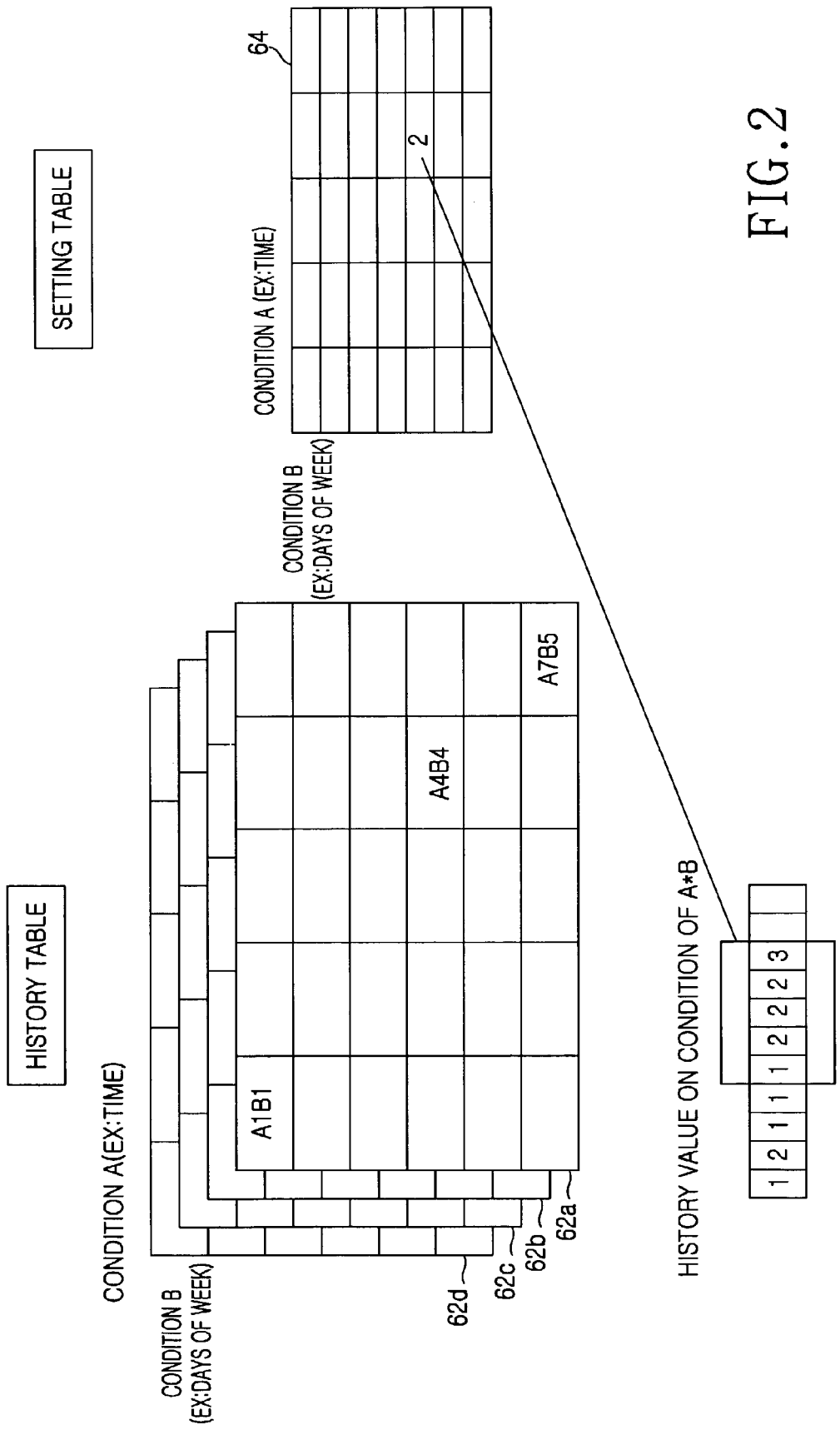
FIG. 2 is a view showing a history table and a setting table according to a preferred embodiment of the present invention.

FIG. 1 is a block diagram of a wireless terminal according to a preferred embodiment of the present invention, and FIG. 2 is a view showing a history table and a setting table according to a preferred embodiment of the present invention. Referring to FIG. 1, the wireless terminal according to the preferred embodiment of the present invention includes a control section 10, a user interface 20, and a memory 60. The wireless terminal also includes several units for enabling a user to set and adjust values for various adjustable functions of the wireless terminal according to his/her preferences in various situations. Contrast of a screen of the wireless terminal is adjusted by a contrast adjusting unit 30 under the control of the control section 10. Volume of the bell sound is adjusted by a bell volume adjusting unit 40 under the control of the control section 10. Further, bell/vibration shifting is carried out by a bell/vibration shifting unit 50 under the control of the control section 10.

The control section 10 of the wireless terminal according to the present invention includes a recognition section 12 and a setting section 14. The recognition section 12 checks whether a user has changed a preset value for an adjustable function of the wireless terminal according to a particular situation. Further, when the user inputs a set value for each function, the recognition section 12 stores the set value in a history table 62 of memory 60 and estimates a value to be stored in a setting table 64 on the basis of a statistic obtained from the set values in the history table 62. The setting section 14 controls each of the units 30, 40, and 50 with reference to the set values in the setting table 64 and conditions for a corresponding function.

The memory 60 includes history table 62 and setting table 64. Referring to FIG. 2, the history table 62 stores set values for each function of the terminal, which have been set by the user according to situations under at least one predetermined condition, for example, on the basis of time. FIG. 2 shows examples of such history tables as described above, which are designated by reference numerals 62a to 62d. Values which have been set by the user with respect to condition A, for example time, and condition B, for example days of the week, for a predetermined function are stored in the history table 62a by the recognition section 12 of the control section 10.

For example, when a user sets an incoming call alarm mode of a wireless terminal to an etiquette mode from 8 a.m. to 5 p.m., the etiquette mode is recorded as one of the history of incoming call alarm modes set by the user in a history table storing the history of incoming call alarm modes according to time, in the wireless terminal according to the present invention. Meanwhile, when a user sets the incoming call alarm mode of the wireless terminal to an etiquette mode in relation to places, a history of incoming call alarm modes according to places is recorded in a history table. Further, when a user sets the incoming call alarm mode of a wireless terminal to an etiquette mode in relation to places and time, the control section 10 of the wireless terminal records a history of incoming call alarm modes according to places and time in a history table. As a result, the wireless terminal can automatically set predetermined values according to the corresponding conditions.

Specifically, in relation to the LCD contrast adjusting function from among the functions of the wireless terminal, at least one condition of which can be selected according to situations by a user, the history table 62 may be constructed as shown in Table 1 shown below. In this case, the control section 10 stores in an LCD contrast history table the fashion in which the user adjusts the LCD contrast. The LCD contrast history table may have a dimension of 7×10 according to the time condition as shown in Table 1, which is obtained by classifying and arranging the user's LCD contrast adjusting history according to seven days, that is, each week, and ten equal time intervals of each day.

TABLE 1

| SUN 1 | MON 1 | TUE 1 | WED 1 | THU 1 | FRI 1 | SAT 1 |
|---|---|---|---|---|---|---|
| SUN 2 | MON 2 | TUE 2 | WED 2 | THU 2 | FRI 2 | SAT 2 |
| SUN 3 | MON 3 | TUE 3 | WED 3 | THU 3 | FRI 3 | SAT 3 |
| SUN 4 | MON 4 | TUE 4 | WED 4 | THU 4 | FRI 4 | SAT 4 |
| SUN 5 | MON 5 | TUE 5 | WED 5 | THU 5 | FRI 5 | SAT 5 |
| SUN 6 | MON 6 | TUE 6 | WED 6 | THU 6 | FRI 6 | SAT 6 |
| SUN 7 | MON 7 | TUE 7 | WED 7 | THU 7 | FRI 7 | SAT 7 |
| SUN 8 | MON 8 | TUE 8 | WED 8 | THU 8 | FRI 8 | SAT 8 |
| SUN 9 | MON 9 | TUE 9 | WED 9 | THU 9 | FRI 9 | SAT 9 |
| SUN 10 | MON 10 | TUE 10 | WED 10 | THU 10 | FRI 10 | SAT 10 |

The setting table 64 stores set values, which are determined for each function by the control section 10, by utilizing statistics obtained from the set values for each function, which are stored in the history table 62. In this case, the control section 10 may determine most frequently-set values in predetermined sections as the set values to be stored in the setting table 64.

The control section 10 estimates statistics of the LCD contrast adjusting values by making use of the history table described above, stores the statistics in the setting table, and then adjusts the contrast on the basis of these statistics in the setting table. That is, the control section 10 controls the contrast adjusting unit 30 with reference to the values in the setting table.

The user interface 20 may be a keypad or a touch screen provided at the wireless terminal. The user can adjust the contrast by adjusting the variable volume through the user interface 20 so as to change the contrast adjusting current. The contrast adjusting unit 30 adjusts the contrast of the LCD according to the set values received from the control section 10 as set by the user.

Figure 3:
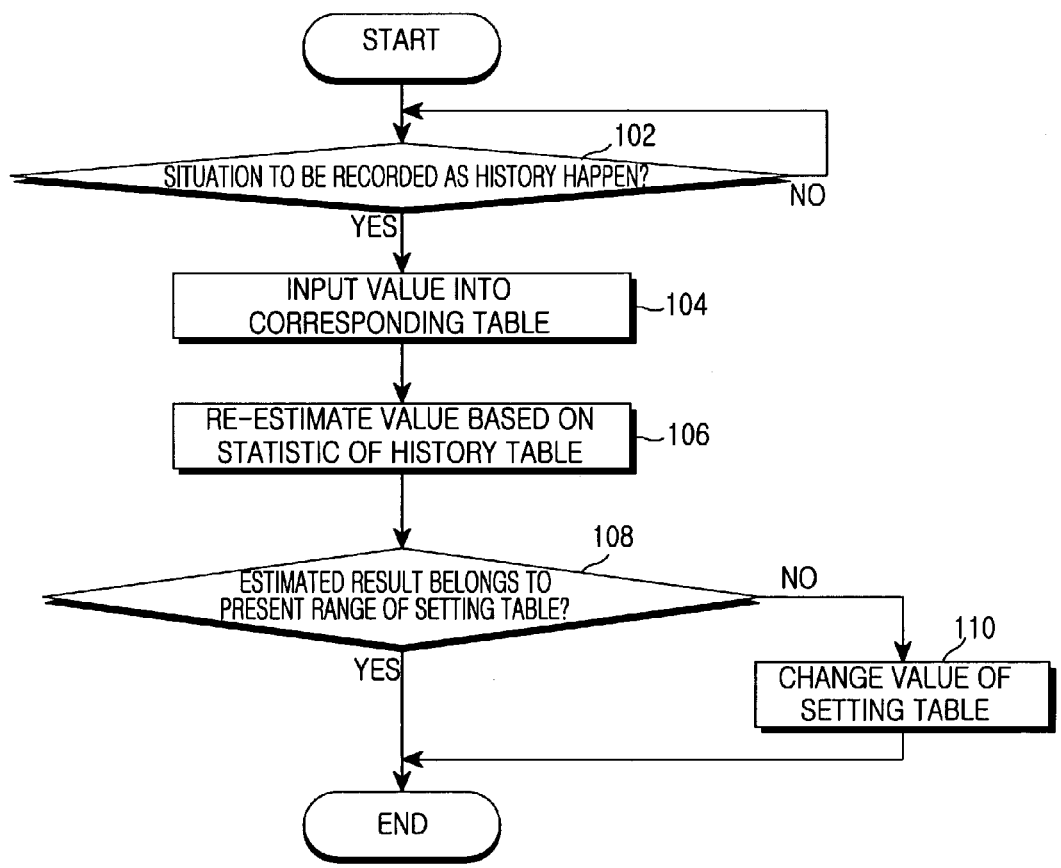
FIG. 3 is a flow chart of a process by the recognition section according to a preferred embodiment of the present invention.

FIG. 3 is a flow chart of a process by the recognition section according to a preferred embodiment of the present invention.

Referring to FIGS. 1 to 3, in step 102, the recognition section 12 checks whether an event to be recorded as history, which means an input of a changed set value according to a particular situation, has occurred or not. The checking for the occurrence of the event to be recorded as history is periodically repeated in order to collect history data. When the event to be recorded as history has occurred, the recognition section 12 stores the changed set value in the corresponding history table 62 in step 104. Thereafter, the recognition section 12 estimates a value to be stored in the setting table 64 on the basis of a statistic of the values in the history table. In other words, whenever the history table 62 is renewed, the recognition section 12 estimates the values to be stored in the setting table 64 by making use of data in the history table on the corresponding condition such as the condition of A4B4 in FIG. 2. In this case, mean values, most frequent values, etc., in the history table 62 may be utilized in estimating the values in the setting table 64. For example, in the case of a set value having divided levels such as the volume, the most frequently-set value may preferably be utilized as the value to be stored in the setting table 64. Thereafter, the recognition section 12 checks whether the value of the setting table 64 estimated in step 108 is in a present value range of the corresponding section of the setting table 64. When the estimated value of the setting table 64 is not in the present value range of the corresponding section of the setting table 64, the recognition section 12 changes the present value in the setting table in step 110. That is, the recognition section 12 estimates the value of the setting table 64 again, and then renews the value of the setting table 64 when the estimated value is different from the present value in the setting table 64. As a result, the setting section 14 can control various functions of the wireless terminal by making use of the values in the setting table.

Figure 4:
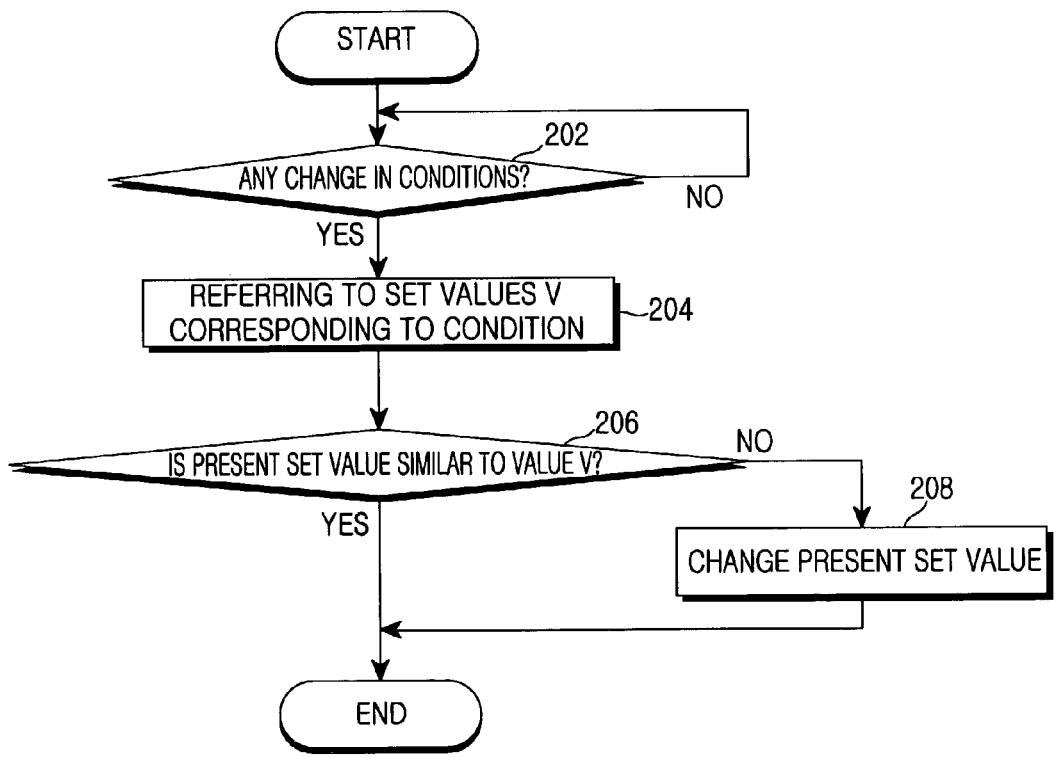
FIG. 4 a flow chart of a process by the setting section according to a preferred embodiment of the present invention.

FIG. 4 a flow chart of a process by the setting section according to a preferred embodiment of the present invention.

Referring to FIGS. 1 to 4, in step 202, the setting section 14 determines whether there is any change in conditions for settable functions of the wireless terminal or not. That is, the setting section 14 examines whether the corresponding conditions for each function has changed or not by monitoring the conditions with reference to the setting table 64. The setting table 64 of FIG. 2 stores set values which are so determined by the control section 10 that they may be applied for each function, with reference to the statistic of set values for each function stored in the history table 62. In step 204, the setting section 14 refers to the set values in the setting table 64, which correspond to the corresponding conditions of each function. Thereafter, in step 206, the setting section 14 examines whether a present set value of the corresponding condition in the setting table 64 is similar to value in a present range of the set values or not. When the present set value of the corresponding condition in the setting table is not in the present range of the set values, the process goes to step 208 and changes the present set value to the set value in the setting table 64.

As described above, the present invention enables a wireless terminal to recognize the user's preference setting pattern for settable functions of the wireless terminal and automatically change the setting of the functions without a user interface.

In a wireless terminal and method according to the present invention, data tables storing user's habits of setting conditions for the wireless terminal are constructed, and the conditions which the user wants are estimated in advance, so as to provide convenience for the user.

Although the above description is given of an embodiment of the present invention in which each function of a wireless terminal has at least one settable value, the present invention may be applied to a menu display frequently utilized by users. For example, the present invention may be utilized in searching a phone book so that a list of phone numbers in a business category can be first displayed for a company or a list of friends to meet on a weekend can be first displayed for a private user.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling functions of a wireless terminal, each of the functions having at least one settable value, the method comprising the steps of:
periodically checking one or more set values for each of the functions and storing the set values for each of the functions in data tables in an arrangement according to predetermined conditions;
estimating a statistic of the set values for each of the functions with reference to the data tables; and
controlling each of the functions according to the estimated statistic.

2. A method as claimed in claim 1, wherein the data tables comprise a history table storing one or more first set values for each of the functions, the first set values corresponding to at least one predetermined condition.

3. A method as claimed in claim 2, wherein the data tables further comprise a setting table storing one or more second set values which are determined for each function by a control section by utilizing a statistic of the first set values for each function, which are stored in the history table.

4. A method as claimed in claim 1, wherein the set values for each of the functions can be changed by a user.

5. A wireless terminal capable of controlling its functions, each of the functions having at least one settable value, the wireless terminal comprising:
one or more data tables for storing one or more set values for each of the functions in an arrangement according to predetermined conditions;
a control section which periodically checks the set values for each of the functions, stores the set values in the data tables, estimates a statistic of the set values for each of the functions with reference to the data tables, and controls each of the functions according to the estimated statistic.

6. A method as claimed in claim 5, wherein the data tables comprise a history table storing one or more first set values for each of the functions, the first set values corresponding to at least one-predetermined condition.

7. A method as claimed in claim 6, wherein the data tables further comprise a setting table storing one or more second set values which are determined for each function by a control section by utilizing a statistic of the first set values for each function.

8. A method as claimed in claim 1, wherein the controlled function includes a phone book setting.

9. A method as claimed in claim 1, wherein the controlled function includes an adjustment of an LCD contrast setting.

10. A method as claimed in claim 1, wherein the controlled function includes a bell volume setting.

11. A method as claimed in claim 1, wherein the controlled function is a user selectable function.

12. The wireless terminal of claim 5, wherein the controlled function is a user selectable function.

* * * * *